United States Patent

[11] 3,623,789

[72] Inventors Motoaki Kawazu;
 Yoshio Fukushima, both of Tokyo, Japan
[21] Appl. No. 57,271
[22] Filed July 22, 1970
[45] Patented Nov. 30, 1971
[73] Assignee Kabushiki Kaish Ricah
 Tokyo, Japan
[32] Priority Aug. 9, 1969
[33] Japan
[31] 44/63190

[54] SYMBOL INDICATION DEVICE
 7 Claims, 4 Drawing Figs.
[52] U.S. Cl. .......................................... 350/9,
 350/45, 350/167, 350/211, 350/232
[51] Int. Cl. ............................................G02b23/12,
 G02b 3/08
[50] Field of Search......................................... 350/9, 167,
 45, 211, 232, 183

[56] References Cited
UNITED STATES PATENTS
1,874,193  8/1932  Keen ........................... 352/81

Primary Examiner—David Schonberg
Assistant Examiner—Paul A. Sacher
Attorney—McGlew and Tuttle ABSTRACT: A symbol indication device comprises a symbol plate having a plurality of symbols thereon and a microlens plate having a number of microlenses, equal in number and position to the respective symbols, arranged in a plane and serving as projecting lenses for the pictures of the symbols. A field lens refracts rays emerging from the microlens plate so that the symbols form images in the same location. A concave lens is positioned at a location such that the rays from the field lens are within the focal length of the concave lens, and a screen is positioned so that the pictures of the symbol are directed thereon through the field lens and the concave lens. A condenser lens converges rays emerging from the screen. Any one of the symbols can be selectively illuminated by a light source to have its picture projected on the screen.

INVENTOR
MOTOAKI KAWAZU
YOSHIO FUKUSHIMA

BY

ATTORNEY

SYMBOL INDICATION DEVICE

BACKGROUND OF THE INVENTION

Referring to FIG. 1, symbols $1a$, $1b$, $1c$ .....$1n$, formed on a symbol plate 1, are arranged in the focal plane of an image forming lens 2, the symbols being spaced equidistantly from each other. A screen 4 is arranged in the focal plane of a field lens 3. Accordingly, if the symbol $1a$ is illuminated by a suitable light source, a beam of light rays, passing through a correlated microlens $2a$, is incident on field lens 3 as a beam of parallel light rays, and an image of symbol $1a$ is formed as a real image A in the focal plane of field lens 3, or on screen 4. The light ray emerging from the center of symbol $1a$ parallel to the optical axis 0 of field lens 3 is positively incident on screen 4 at the center thereof, or on the optical axis 0.

If it is desired to see the real image A on screen 4 with uniform brightness in any position, it is necessary to arrange a condenser lens, or a Fresnel lens 5, adjacent screen 4 on the side thereof or distant from field lens 3, to converge the light rays into a smaller area. In FIG. 1, $6a$, $6n$ are virtual images of the respective microlenses $2a$, ....$2n$ formed by field lens 3 and as seen looking from the screen 4 or from the right in FIG. 1. $7a$, ..... $7n$ are real images of the respective microlenses 2, ..... $2n$ formed when Fresnel lens 5 is used. If viewed looking from the right towards screen 4, the image formed by the light rays is seen as if it is provided by the virtual images $6a$, .....$6n$.

If only symbol $1a$ is projected, Fresnel or condenser lens 5 crosses the projected light rays to converge in a smaller area, as at $7a$. However, when symbol $1n$, which is disposed symmetrically with symbol $1a$ with respect to optical axis 0, is projected, the beam of light rays converges in the position of the real image $7n$. Thus, it is impossible for a viewer, remaining in the same position, to see the images of symbols $1a$ and $1n$ as images of uniform brightness. While, if screen 4 is formed to have a fully diffusing surface, the images of all the symbols can be seen as images of substantially uniform brightness, when projected individually, this entails a loss of light and the overall picture of each individual image is rather dark.

This problem can be obviated by a sufficient reduction in the space between adjacent real images $7a$ ..... $7n$, and by using a screen of low diffusivity. The spacing between adjacent real images can be reduced if the angle $2\omega_1$, formed by the line connecting the center of screen 4 with real image $7a$ and the line connecting the center of screen 4 with real image $7n$, or the angle formed by the line connecting the center of screen 4 with virtual image $6a$ of microlens $2a$ and the line connecting the center of screen 4 with virtual image $6n$ of microlens $2n$, is reduced sufficiently. In this case, the distance between the position of the viewer and the screen is considered to be substantially constant.

If the spacing between adjacent symbols $1a$.....$1n$ on symbol plate 1 is reduced as much as possible, the spacing between adjacent virtual images $6a$ .....$6n$ naturally will be reduced, so that the aforementioned problem can be obviated. However, the reduction in the spacing between adjacent symbols $1a$ ..... $1n$ has disadvantages. For example, symbol plate 1 is reduced in size, and it is not possible to use a light source of high brightness, thus making it impossible to obtain an image of high brightness.

If it is desired to increase the size of the images on screen 4, this objective can be attained by increasing the dimensions of the symbols on the symbol plate, or increasing the focal length of field lens 3 to increase the projection distance. However, the dimensions of the symbols on the symbol plate 1 cannot be increased too greatly because the size of the symbols is limited by the number of symbols on the symbol plate. An increase in the focal length of field lens 3 is advantageous in that the projection magnification of the device can be increased and the angle formed by the line connecting the center of the screen with the virtual image $6a$ and the line connecting the center of the screen with the virtual image $6n$ can be reduced. However, this arrangement has the disadvantage that the overall length of the device is increased in a direction parallel to optical axis 0.

SUMMARY OF THE INVENTION

This invention relates to a symbol indication device for selectively projecting, on a screen, the picture of one of the symbols formed on a symbol plate. More particularly, the invention is directed to an improved symbol indication device which is more compact and which provides a uniformly clear and bright picture of a symbol on a screen irrespective of the position of the viewer.

In accordance with the invention, compactness of the symbol indication device is attained by interposing, between the field lens and the screen, a concave lens. In one embodiment of the invention, the distance between the symbol plate and the screen is maintained equal to the distance between the symbol plate and the screen in a symbol indication device not having the interposed concave lens. Nevertheless, a bright image of a selected symbol appears on the screen and is uniformly bright irrespective of the viewing position.

In another embodiment of the invention, the invention symbol indication device has the same magnifying power as that of a symbol indication device not incorporating the interposed concave lens, and by appropriate selection of the focal lengths of the microlenses, the field lens, and the concave lens, the spacing between the symbol plate and the screen is reduced very substantially resulting in a substantial reduction in the overall length of the symbol indication device.

An object of the invention is to provide an improved symbol indication device.

Another object of the invention is to provide such an improved symbol indication device including a symbol plate, a microlens plate, a field lens and a screen, with a concave lens interposed between the field lens and the screen.

A further object of the invention is to provide such an improved symbol indication device in which the overall length of the device, measured parallel to its optical axis, is very substantially reduced.

Another object of the invention is to provide such am improved symbol indication device in which the clarity and brightness of the projected images of the symbol on the screen are improved and more uniform than hitherto obtainable, irrespective of the position of the viewer.

For an understanding of the principles of the invention, reference is made to the following description of typical embodiments thereof as illustrated in the accompanying drawings.

DESCRIPTION OF THE PREFERRED EMBODIMENTS

Figure 2:
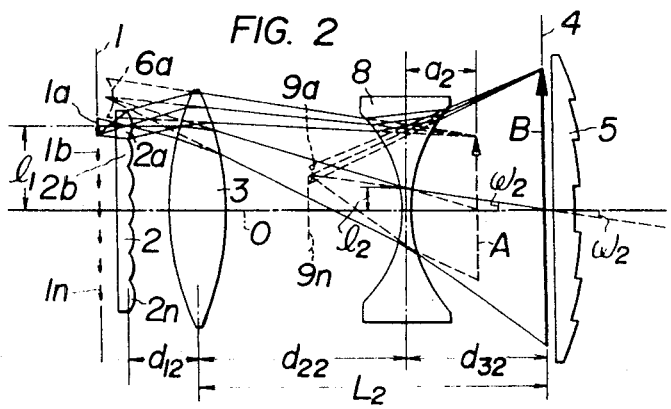
FIG. 2 is a view, similar to FIG. 1, of a symbol indication device in accordance with one embodiment of the invention.
Figure 3:
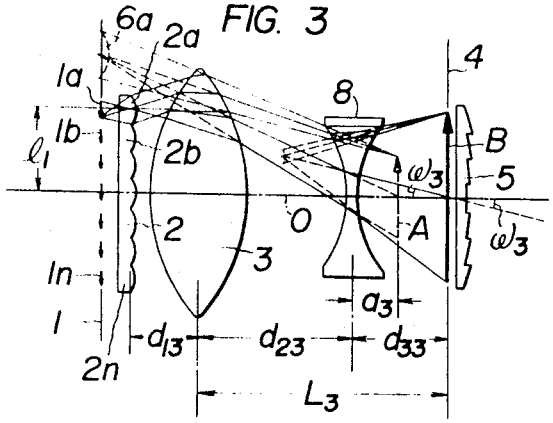
FIG. 3, is a view, similar to FIG. 1, of a symbol indication device in accordance with another embodiment of the invention.

The preferred embodiments are illustrated in FIGS. 2 and 3, in which similar parts, having the same construction and operating in the same manner, have been given like reference characters and will be referred to, in detail, only with respect to one of the embodiments, it being understood that this detailed description applies also to the other embodiments.

Referring to FIG. 2, a concave lens 8 is positioned between real image A, of the symbol $1a$ formed by microlens $2a$, and field lens 3, with real image A being positioned in advance of the focal plane of concave lens 8. As seen looking from the right of screen 4, virtual images of microlenses $2a$, .....$2n$, as formed by field lens 3 and concave lens 8, appear at $9a$, .....$9n$. In this embodiment of the invention, the spacing between symbol plate 1 and screen 4, parallel to optical axis 0, has the same value as the spacing between symbol plate 1 and screen 4 in FIG. 1. A beam of light rays emerging from any particular point in symbol 1a is converted into a beam of parallel light rays by the associated microlens 2a. This beam of parallel rays would be changed into the beam of converging rays by field lens 3 and form an image in the focal plane of field lens 3, corresponding to real image A, if there were no concave lens 8. However, the direction of the beam of converging light rays is refracted by concave lens 8 so as to form a real image B on screen 4. Virtual image 6a of microlens 2a, produced by field lens 3 and as viewed from the right of screen 4, is converted into a virtual image 9a by concave lens 8. In the optical system of FIG. 2, the angle corresponding to the angle $\omega_1$ of FIG. 1 is an angle $\omega_2$, which is formed by optical axis 0 and the line connecting the center of screen 4 with virtual image 9a.

Figure 1:
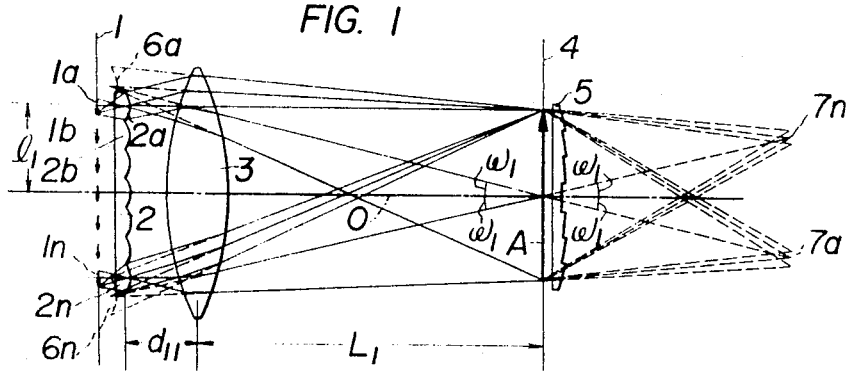
FIG. 1 is a schematic side elevation view of a known form of a symbol indication device.

The magnifying power of the symbol indication devices shown in FIGS. 1 and 2 will now be compared by comparing the size of the real image on screen 4 with the size of the symbols 1a, .... 1n on symbol plate 1. The magnifying power of the device shown in FIG. 1 is 12.5 when the focal length $f_{21}$ of microlenses 2a, ..... 2n is 4 mm., the focal length $f_{31}$ of field lens 3 is 50 mm., and the distance $d_{11}$ between the center of radius of microlens plate 2 and the center of filed lens 3 is 10 mm. In the embodiment of the invention shown in FIG. 2, the magnifying power is substantially 20 when the focal length of $f_{22}$ of the microlenses is 4 mm., the focal length $f_{32}$ of field lens 3 is 40 mm., the focal length $f_{R2}$ of concave lens 8 is −20 mm., the distance $d_{12}$ between the center of radius of microlens plate 2 and the center of field lens 3 is 10 mm., the distance $d_{22}$ between the center of field lens 3 and the center of concave lens 8 is 30 mm., and the distance $d_{32}$ between the center of concave lens 8 and the surface of screen 4 is 20 mm.

If the angle $\omega$ is expressed tangentially, $\tan \omega_1 = 0.25$ in the device of FIG. 1 and $\tan \omega_2 = 0.148$ in the device of FIG. 2, so that angle $\omega_2$ is smaller than angle $\omega_1$. If these angles are expressed in terms of the convergence of the light rays at a position based 250 mm. from screen 4, and in which there can be clearly seen the image on the screen, this range will be in the form of a square having a side of 140 mm., in the device of FIG. 1, and in the form of a square, having a side of 86 mm., in the device of FIG. 2. It thus will be evident that the device of FIG. 2 permits seeing images of all the symbols, with uniform brightness, when screen 4 is viewed from substantially the same position.

The embodiment of the invention shown in FIG. 3 has the same magnifying power as the symbol indication device of FIG. 1. In FIG. 3, the focal length $f_{23}$ of microlenses 2a.....2n is 4 mm., the focal length $f_{33}$ of field lens 3 is 25 mm., the focal length $f_{k3}$ of concave lens 8 is −14 mm., the distance or spacing $d_{13}$ between the center of radius of microlens plate 2 and the center of field lens 3 is 10 mm., the distance $d_{23}$ between the center of field lens 3 and the center of concave lens 8 is 18 mm., and the distance $d_{33}$ between the center of concave lens 8 and the surface of screen 4 is 14 mm. In the embodiment of FIG. 3, the angle $\omega$ may be expressed tangentially as $\tan \omega_3 = 0.24$ which is substantially the same as $\tan \omega_1 = 0.25$ in the device of FIG. 1. The advantage of the embodiment of the invention shown in FIG. 3 over the symbol indication device shown in FIG. 1 resides in the fact that the spacing between symbol plate 1 and screen 4 in FIG. 3 is much smaller than the corresponding spacing in FIG. 1, resulting in a compact overall size of a symbol indication device.

For a further understanding of the invention as compared with prior art symbol indication devices, the following mathematical analysis will be helpful. The projection magnification $M_1$ of the symbol indication device of FIG. 1 can be expressed by the following equation:

$$M_1 = f_{32}/f_{21} \quad (1)$$

The projection magnification $M_2$ of the embodiment of the invention shown in FIG. 2 can be expressed as follows:

$$M_2 = f_{32}/f_{22} \times d_{32}/a_2 \quad (2)$$

where $a_2$ is the distance between the center of concave lens 8 and virtual image A.

Since the spacing $L_1$ between the center of field lens 3 and the surface of screen 4, in the indication device of FIG. 1, is equal to the spacing $L_2$ between the center of field lens 3 and the surface of screen 4 in the embodiment of the invention shown in FIG. 2, and since $L_1 = f_{31}$ and $L_2 = f_{32} + (d_{32} - a_2)$, $$f_{31} = f_{32} + (d_{32} - a_2) \quad (3)$$

where $d_{32} > a_2$.

A comparison of $M_1$ with $M_2$ results in the following relation:

$$M_2 - M_1 = f_{32}/f_{22} \times d_{32}/a_2 - f_{31}/f_{21}. \quad (4)$$

By substituting equation (3) into equation (4), followed by suitable transposition, equation (4) can be rewritten as follows:

$M_2 - M_1 = (f_{32} \times d_{32})/(f_{22} \times a_2) - \{f_{32} + (d_{32} - a_2)\}/f_{21}$
$= \{f_{32} \times d_{32} - f_{32} \times a_2 - a_2(d_{32} - a_2)\}/(f_{22} \times a_2)$
$= \{f_{32}(d_{32} - a_2) - a_2(d_{32} - a_2)\}/(f_{22} \times a_2)$
$= (f_{32} - a_2)(d_{32} - a_2)/(f_{22} \times a_2)$ where $f_{21} = f_{22}$. Since $f_{32} - a_2 = d_{22}$ in the device shown in FIG. 2.

$$M_2 - M_1 = d_{22}(d_{32} - a_2)/(f_{22} \times a_2) > 0$$

Therefore, $$M_2 > M_1$$

From the foregoing, it will be apparent that the magnifying power of the embodiment of the invention shown in FIG. 2 is higher than that of the symbol indication device shown in FIG. 1.

A comparison of $\tan \omega_1$ with $\tan \omega_2$ results in the following relation:

$$\tan \omega_1 = l_1/L_1 = l_1/f_{31} \quad (5)$$

where $l_1$ is the distance between optical axis 0 and the optical axis of microlens 2a in FIG. 1.

Correspondingly, in the embodiment of the invention shown in FIG. 2, $l_2/a_2 = l_1/f_{32}$ where $l_2$ is the distance between optical axis 0 and the point at which the line, connecting the center of virtual image A with the center of virtual image 6a, intersects the centerline of concave lens 8.

Consequently, $$\tan \omega_2 = l_2/d_{32} = l_1 \times a_2/(f_{32} \times d_{32}).$$

From the equation (2), there is derived the following equation:

$$a_2/(d_{32} \times f_{32}) = 1/(M_2 \times f_{22}).$$

Consequently, $$\tan \omega_2 = l_1/(M_2 \times f_{22}) \quad (6)$$

From equation (1), $$1/f_{31} = 1/(M_1 \times f_{21}).$$

By substituting this equation into equation (5), the following relation is obtained:

$$\tan \omega_1 = l_1/(M_1 \times f_{21}). \quad (7)$$

Since $f_{21} = f_{22}$ and $M_2 > M_1$, the ratio of equation (6) to equation (7) can be written as follows:

$$\tan \omega_2/\tan \omega_1 = l_1/(M_2 \times f_{22})/l_1/(M_1 \times f_{21}) = M_1/M_2 < 1 \text{ so that}$$
$$\tan \omega_2 < \tan \omega_1.$$

Consequently, the embodiment of the invention shown in FIG. 2 results in an area of ray convergence, after the light has passed through the Fresnel lens, which is smaller than the area of convergence in the symbol indication device of FIG. 1.

Comparing now the embodiment of the invention shown in FIG. 3 with the symbol indication device of FIG. 1, the angle $\omega_3$ of the embodiment of the invention shown in FIG. 3 can be expressed tangentially as follows:

$$\tan \omega_3 = l_1/(M_3 \times f_{23})$$

where $M_3$ is the projection magnification of the device of FIG. 3. Since $M_3 = M_1$ and $f_{23} = f_{21}$, $\tan \omega_3 = l_1/(M_1 \times f_{21}) = \tan \omega_1$.

Thus, the angle $2\omega_1$, formed by the line connecting the center of screen 4 with virtual image 6a of microlens 2a and the line connecting the center of screen 4 with virtual image 6n of microlens 2n, in FIG. 1, is equal to the angle $2\omega_3$, formed by the line connecting the center of screen 4 with virtual image 6a of microlens 2a and the line connecting the center of screen 4 with virtual image 6n of microlens 2a, in FIG. 3. Comparing the distance $L_1$ between the center of field lens 3 and the surface of screen 4, in the device of FIG. 1, and the distance $L_3$, in the device of FIG. 3 and corresponding to the distance $L_1$, results in the following relation:

$$L_3 = f_{33} + d_{33} - a_3$$

where $a_3$ is the distance between the center of concave lens 8 and virtual image A, as well as the following equation:

$$M_3 = f_{33}/f_{23} \times d_{33}/a_3.$$

Since $M_3 = M_1$, $$f_{33}/f_{23} \times d_{33}/a_3 = f_{31}/f_{21}.$$

Since $f_{23} = f_{21}$, $$f_{31} = f_{33} \times d_{33}/a_3$$

Therefore, $$L_1 - L_3 = f_{31} - (f_{33} + d_{33} - a_3)$$
$$= f_{33} \times d_{33}/a_3 - (f_{33} + d_{33} - a_3)$$
$$= \{ f_{33} \times d_{33} - f_{33} \times a_3 - a_3(d_{33} - a_3) \} / a_3$$
$$L_1 - L_3 = \{ f_{33}(d_{33} - a_3) - a_3(d_{33} - a_3) \} / a_3$$
$$= (f_{33} - a_3)(d_{33} - a_3)/a_3$$

Since $f_{33} - a_3 = d_{23}$ and $d_{33} > a_3$, $$L_1 - L_3 > 0$$

Therefore, $$L_1 > L_3$$

From the foregoing, it will be apparent that, if the symbol indication device of FIG. 1 and the embodiment of the invention shown in FIG. 3 are designed so as to have the same magnifying power, the distance $L_3$ can be made smaller than the distance $L_1$.

From the foregoing, it will be appreciated that the present invention, in which concave lens 8 is interposed between condenser lens 3 and screen 4, has numerous advantages. Thus, if a symbol indication device in accordance with the invention and embodying concave lens 8 has the same magnifying power as a symbol indication device not having the concave lens, it is possible to obtain a much more compact overall size, when the picture is viewed through a Fresnel or condenser lens 5, than is possible in known devices. When there is a difference in magnifying power between the device embodying the invention and a symbol indication device having no concave lens, it is possible to view all symbol images with uniform brightness from the same position.

In the foregoing description, the symbols $1a,\ldots 1n$ have been described as disposed in the focal planes of the respective microlenses $2a,\ldots 2n$, respectively, and the images of the symbols have been described as being formed in the focal plane of field lens 3. However, this arrangement is not critical. If each symbol is disposed inwardly of the focal plane of the corresponding microlens, the beam of light rays emerging from the microlens will be in the form of a beam of diverging rays. What is required, in this case, is to convert the beam of diverging rays into a beam of converging rays, by the field lens. In such case, the images of the symbols will not be formed in the focal plane of the field lens but in a plane spaced from this focal plane. Therefore, the images of those symbols disposed other than on the optical axis of the field lens will be formed in positions which are displaced from the optical axis of the field lens. This deviation can be compensated by arranging the center of each symbol so that it is at a position displaced from the optical axis of the corresponding microlens by an amount corresponding to the displacement of the image from the optical axis of the field lens. The direction of the light, for illuminating the symbols, has to be displaced accordingly.

Conversely, if the symbols are disposed outwardly of the focal planes of the respective microlenses, the images of the symbols will be displaced from the optical axis of the field lens in a direction opposite to that in which displacement occurs when the symbols are disposed inwardly of the focal planes of the respective microlenses. This deviation can be compensated in the same manner as described.

Figure 4:
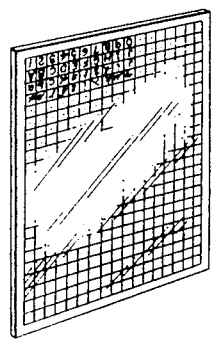
FIG. 4 is a perspective view of a symbol plate used in the indication devices shown in FIGS. 1, 2 and 3.

Referring to FIG. 4, the symbols on symbol plate 1 are so formed that only those portions of FIG. 1 carrying the symbols will transmit light. In accordance with the invention, an opaque sheet material may be used as a symbol plate and each symbol can be formed by stamping out or by etching. Alternatively, a transparent sheet material may be used as a symbol plate, and an opaque paint may be applied to the plate in such a manner as to mask all portions of the plate except those portions forming the symbols. As a further alternative, a negative, produced by taking a picture of the symbols in the reverse direction along the optical path of the device, may be used. As a source of light for selectively illuminating any one of the symbols, any known illumination means may be used as desired.

While specific embodiments of the invention have been shown and described in detail to illustrate the application of the principles of the invention, it will be understood that the invention may be embodied otherwise without departing from such principles.

What is claimed is:

1. A symbol indication device comprising, in combination, a symbol plate having a plurality of transparent symbols thereon for illumination by illumination means; a microlens plate arranged in spaced parallel relation to said symbol plate and having thereon a number of microlenses corresponding to the number of symbols on said symbol plate, each microlens being correlated, in position, with a respective symbol; said microlenses constituting projecting lenses for projecting pictures of the respective symbols; a field lens positioned in spaced relation to said microlens plate and on the opposite side of the latter from said symbol plate, said field lens refracting a beam of rays projected from said microlens plate in a manner such that the respective symbols form images in a common plane; a concave lens centered on the optical axis of said field lens and in axially spaced relation to said field lens; a transparent screen spaced axially from said concave lens for receiving the images of said symbols thereon through said field lens and said concave lens; and a condenser lens adjacent said transparent screen and converging a beam of light rays passing through said screen.

2. A symbol indication device, as claimed in claim 1, in which the spacing of said concave lens from said field lens is such that a beam of light rays passing through said field lens is within the focal length of said concave lens.

3. A symbol indication device, as claimed in claim 2, in which the axial distance between said symbol plate and said screen is equal in the axial distance between the symbol plate and the screen of a comparison symbol indication device identical with said first-mentioned symbol indication device except for omission of said concave lens, but in which said first-mentioned symbol indication device has a magnifying power substantially greater than that of the comparison symbol indication device.

4. A symbol indication device, as claimed in claim 2, in which the magnifying power thereof is equal to the magnifying power of a comparison symbol device identical with said first-mentioned symbol indication device except for omission of said concave lens, but in which the distance between said symbol plate and said screen of said first-mentioned symbol indication device is substantially less than the distance between the symbol plate and screen of the comparison symbol indication device.

5. A symbol indication device, as claimed in claim 2, in which said symbols are positioned in the focal planes of the respective microlenses.

6. A symbol indication device, as claimed in claim 2, in which said symbols are positioned inside the focal planes of the respective microlenses and are correspondingly offset from the optical axes of the respective microlenses.

7. A symbol indication device, as claimed in claim 2, in which said symbols are disposed outside the focal planes of the respective microlenses and are offset correspondingly from the optical axes of the respective microlenses.

* * * * *